United States Patent [19]
Miyahara

[11] Patent Number: 4,769,530
[45] Date of Patent: Sep. 6, 1988

[54] FOCUSING DEGREE-DETECTING DEVICE WITH A REDUCTION OPTICAL SYSTEM
[75] Inventor: Noriyuki Miyahara, Tokyo, Japan
[73] Assignee: Olympus Optical Co., Ltd., Tokyo, Japan
[21] Appl. No.: 934,115
[22] Filed: Nov. 24, 1986
[30] Foreign Application Priority Data
Dec. 2, 1985 [JP] Japan ................................ 60-271133
[51] Int. Cl.⁴ .............................................. G01J 1/20
[52] U.S. Cl. .................................... 250/201; 350/519
[58] Field of Search ................ 250/201, 204; 350/414, 350/519; 354/403; 356/4, 1; 353/101

[56] References Cited
U.S. PATENT DOCUMENTS

| 4,443,078 | 4/1984 | Niwa et al. | 356/4 |
| 4,445,029 | 4/1984 | Nagaoka et al. | 356/4 |
| 4,511,232 | 4/1985 | Yamada | 250/201 |
| 4,523,828 | 6/1985 | Kato | 354/403 |
| 4,549,802 | 10/1985 | Ohtaka | 354/403 |
| 4,595,829 | 6/1986 | Neümann et al. | 250/201 |
| 4,687,913 | 8/1987 | Chaban | 250/201 |

FOREIGN PATENT DOCUMENTS 58-217909 12/1983 Japan .
60-42725 3/1985 Japan .

Primary Examiner—David C. Nelms
Assistant Examiner—Michael Messinger
Attorney, Agent, or Firm—Frishauf, Holtz, Goodman & Woodward

[57] ABSTRACT

An automatic focusing microscope projects infrared rays onto a specimen along optical paths oblique to the optical axis of an optical system. For the focusing operation, a degree of focusing in the optical system is detected according to the deviation of the reflected rays from the optical axis. A reduction optical system with a positive refractive is placed between an objective and its image plane, so that the displacement of the image plane by visible and infrared rays is reduced. In the reduction optical system, the post principal point is located between the objective and its image plane and nearer to the image plane. The focal distance is less than ½ the focal distance of the objective. A focusing degree-detecting means is made up of a position sensor for sensing the position of the image formed by the reflected rays. An offset signal for correcting an amount of aberration, which is based on the focal distance of the objective, is added to the output signal of the sensor, to form a focusing degree-detecting signal.

12 Claims, 11 Drawing Sheets

FOCUSING DEGREE-DETECTING DEVICE WITH A REDUCTION OPTICAL SYSTEM

BACKGROUND OF THE INVENTION

This invention relates to a focusing degree-detecting device used for an automatic focusing apparatus which detects, by using infrared rays, whether or not an optical system is in an in-focus state, and if not, automatically places the optical system in the in-focus state. More particularly, this invention relates to a focusing degree-detecting device which can precisely detect the degree of focusing in the optical system irrespective of the displacement of image planes by infrared rays and visible rays, which arises from a chromatic aberration of an objective and in accordance with the achromatic (or apochromatic) type of the objective and the focal length (magnification) of the objective.

Good response and high accuracy are required for the focusing degree-detecting devices which are used in optical instruments and medical devices such as cameras, microscopes, rigid-endoscopes, and fundus cameras. One of the prior arts of this type of device is Japanese Patent Disclosure (KOKAI) No. 60-42725 describing the light mark projection-type detecting device. In this prior art, in order to detect the degree of focusing, emitted light beam and reflected light beam are passed through different optical paths in an optical system. The shift of the reflected light spot of the light source of the image plane is detected as the focusing degree. In the projection-type detecting devices, the TTL-type detecting devices have been the predominant type used. Further, since the reflected projection beams enter the viewing field, the infrared rays are used for the projection rays.

The image planes determined by infrared rays and visible rays are displaced due to the chromatic aberration of the objective. Therefore, some measure must be taken, in order to correct this displacement of the image planes. Chromatic aberration varies according to the focal distance and the achromatic type of the objective. Therefore, each time the objective is replaced, the amount of correction of the correcting means must be altered. This is problematic particularly in the case of a microscope in which the difference in focal distances of the objectives varies greatly.

A device for correcting displacement of the image planes due to the objective replacement is disclosed in Japanese Patent Disclosure (KOKAI) No. 58-217909 (West German Patent Application No. P3219503.6). In this device, a correction optical system, movable by a fixed distance in the direction of the optical axis, is provided for moving the image plane as determined by infrared rays. When the objective is replaced, the correction optical system is moved.

Figure 16:
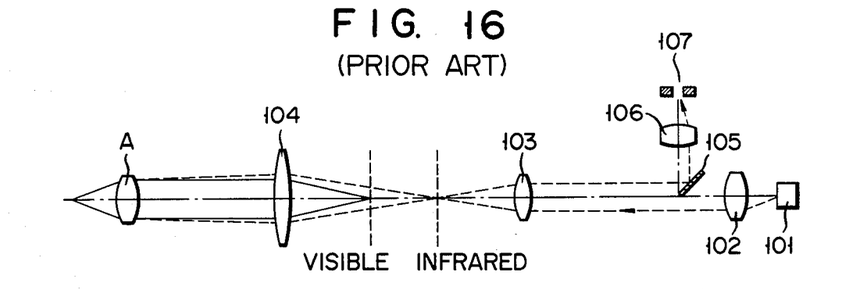
FIG. 16 shows how to form an image by objective A.

The principles of this device will be described with reference to FIGS. 16 to 18. FIG. 16 illustrates how objective A forms an image. Solid lines indicate light beams of visible rays, and broken lines light beams of infrared rays. The laser beams of infrared rays, which are emitted from laser diode 101, are projected onto an object, through convex lens 102, correction lens 103, tube lens 104, and objective A. Mirror 105 is provided between convex lens 102 and correction lens 103. The laser beams reflected by mirror 105 are focused by imaging lens 106 onto photo sensor 107, so that an image of the object is formed thereon.

Figure 17:
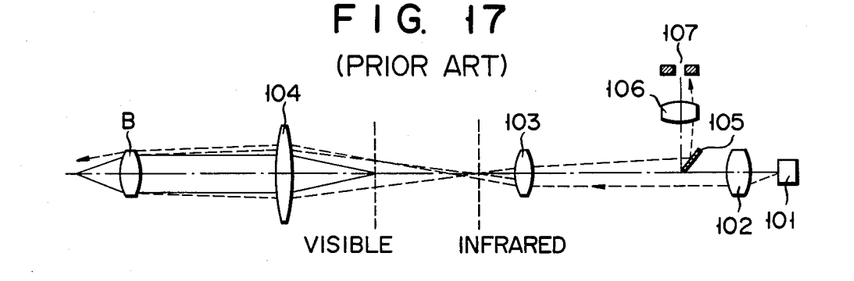
FIG. 17 shows how to form an image by objective B.

FIG. 17 shows how objective B, having a focal distance different from that of objective A, forms an image. In this optical system, the image formed by visible rays is formed at the same position as that in the case of FIG. 16, but the image formed by infrared rays is formed at a position different from that in the case of FIG. 16. This is due to the fact that the different focal distances of the objectives used lead to different aberrations. In this case, the infrared rays from laser diode 101 are not focused on photo sensor 107, and the optical system is thus in the out-of-focus state.

Figure 18:
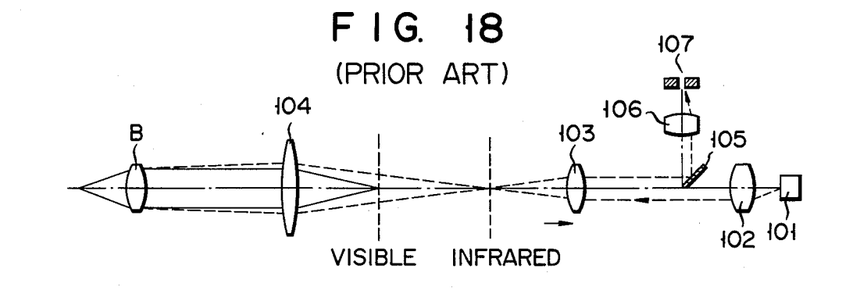
FIG. 18 shows how to correct displacement of the infrared image plane by a correction lens.

As is shown in FIG. 18, correction lens 103 is manually or electrically moved for correcting the focusing position of infrared rays.

The manual operation for such delicate and precise positioning of the objective, for each replacement of the objective, is troublesome work and requires considerable skill. Positioning by electrical means requires an expensive motor and its drive and control circuitry, so that the product is bulky in structure and increased in cost.

SUMMARY OF THE INVENTION

Accordingly, an object of this invention is to provide a focusing degree-detecting device of the light mark projection-type, for detecting the degree of focusing in an optical system, by using infrared rays which can correct the displacement of the image planes by visible rays and infrared rays due to the chromatic aberration and magnification of objective, with good operability and in an inexpensive manner.

According to this invention, there is provided a focusing degree-detecting device comprising:

a viewing optical system including an objective;

focusing degree-detecting means which projects infrared rays to an object through a light path deviated from the optical axis and obtains the information on the focusing degree of the optical system for the object, based on the deviation of the reflected light by the object from the optical axis;

A reduction optical system having a positive refractive power and provided between the objective and image plane by the objective; and Compensating circuit means for correcting the focusing degree information obtained by the focusing degree-detecting means according to the magnification of the objective.

BRIEF DESCRIPTION OF THE DRAWINGS

FIGS. 1 and 2 show views of optical systems for explaining the principle of detecting a degree of focusing in an optical system according to this invention, in which

FIGS. 3 through 5 show views for explaining a reduction optical system used in this invention, in which

FIGS. 16 through 18 show, for explaining the prior art, views for illustrating the displacement of the image planes by visible and infrared rays, which is caused by the chromatic abberation of the objective, in which

DETAILED DESCRIPTION OF THE PREFERRED EMBODIMENTS

Figure 1:
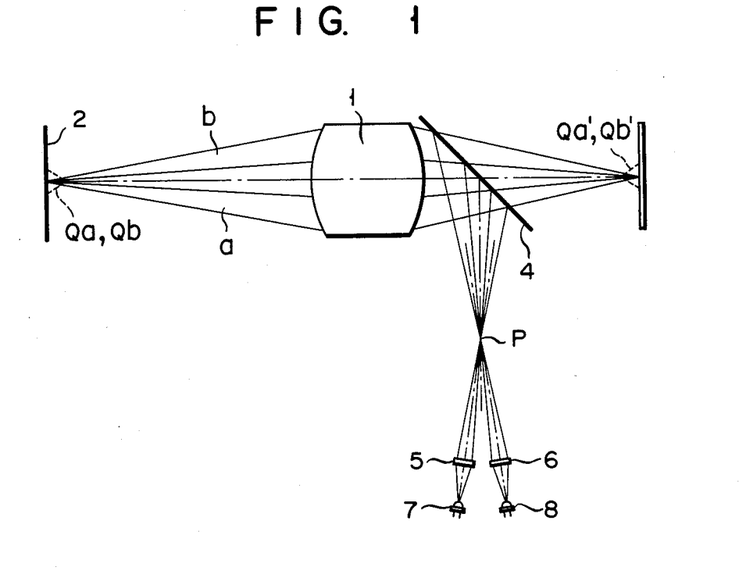
FIG. 1 shows an optical system when the optical system is in the in-focus state.

Before proceeding with description of a focusing degree-detecting device according to this invention, the principle of detecting a degree of focusing in an optical system will be given, with reference to FIGS. 1 and 2. FIG. 1 shows a focusing degree-detecting system in which object 2 is located at the focal point of objective (photographic lens) 1. In this system, a plurality of light beams pass through different optical paths, which are deviated from the optical axis of the optical system. For example, light beams "a" and "b" pass through optical paths oblique to the optical axis of objective 1. These beams are applied to object 2. The light beams are reflected from object 2 and go to photo sensing element 3. The deviation of the reflected light beam spot from the optical axis on photo sensing element 3 is used for detecting the degree of focusing. In this respect, for describing the principle of the focusing degree detection, a single light beam suffices.

A point image by light emitting element (laser diode) 7 for emitting infrared rays passes through small lens 5 and position P which is conjugate with respect to the image plane of objective 1. The point image is reflected by beam splitter 4 and becomes a light beam "a" through objective 1. Then, it is imaged as a point image Qa on object 2 which is located at the focal point. If the object 2 has a rough surface, the point image Qa is scattered and enters the entire opening of objective 1, and forms an image as point image Qa' on photo sensing element 3, which is located on the image plane. When object 2 has a polished surface, the point image Qa is reflected at the object and becomes a light beam "b", and images as point image Qa' on photosensing element 3.

A point image emitted from light emitting element 8 through small lens 5 is imaged as point image Qb' on photo sensing element 3.

Accordingly, in an in-focus state, the point image Qa' by light emitting element 7 and the point image Qb' by light emitting element 8 are both formed as point images at the same location on the optical axis.

Figure 2:
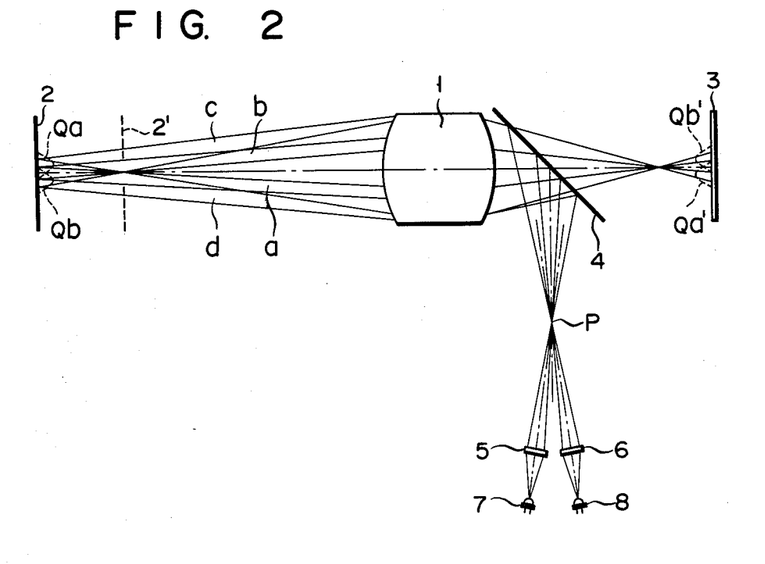
FIG. 2 shows an optical system when it is in the out-of-focus state.

FIG. 2 shows an optical system in which object 2 is located at a position displaced from a focal point of objective 1. The point image by light emitting element 7 passes through small lens 5 and position P which is conjugate with respect to the image plane of objective 1. It is reflected at beam splitter 4 and passes through objective 1 and becomes light beam "a". The light beam "a" is formed as defocused point image Qa on object 2 located at a defocused position. The focused position is designated by reference numeral 2'. When object 2 has a rough surface, point image Qa is scattered to become the luminous flux with a diameter almost equal to the opening of objective 1. The scattered luminous flux passes objective 1, and forms a defocused point image Qa' on photo sensing element 3 which is located in the image plane. When object 2 has a polished surface, the light beam is reflected at object 2 and applied as luminous flux "c" to photo sensing element 3. The flux "c" forms point image Qa' on photo sensing element 3.

The point image by light emitting element 8 travels through small lens 6, and forms point image Qb' on photo sensing element 3 (refer to light beams "b" and "d").

Thus, in an out-of-focus state, the point image Qa' by light emitting element 7 and the point image Qb' by light emitting element 8 are formed at different positions which are displaced from the optical axis.

If light emitting elements 7 and 8 are alternately driven to emit light, in the in-focus state, the point images by light emitting elements 7 and 8 on photo sensing element 3 are formed at the same positions, while in the out-of-focus state, the point images Qa' and Qb' are formed at different positions.

Therefore, to execute the focusing operation, it is only required that light emitting elements 7 and 8 be alternately driven and that objective 1 (object 2 in the case of the microscope) be moved along the optical axis so that the point image is fixed at a fixed position.

It is possible to detect a prefocal point or a post focal point, and amount of the defocus. If the defocusing amount is small, the defocusing amount "d" of the image on the surface of the photo sensing element 3 is expressed by $$d = \delta/(2\tan(\theta/2)) \quad (1)$$

where $\theta$ is an angle formed by the light beams by light emitting diodes 7 and 8, and $\delta$ is a distance of movement of the point image along the optical axis.

The in-focus state can be established if the objective is moved a distance "d'" which is given by the following equation (2)

$$d' = \delta/(2\beta^2 \tan(\theta/2)) \quad (2)$$

where $\beta$ is the magnification of the optical system.

While the point image has been discussed in the above description, it should be understood that this invention is applicable for images other than the point image.

The principle of a reduction optical system for correcting a difference between the imaging positions of the images by infrared rays and visible rays, will be described.

Figure 3:
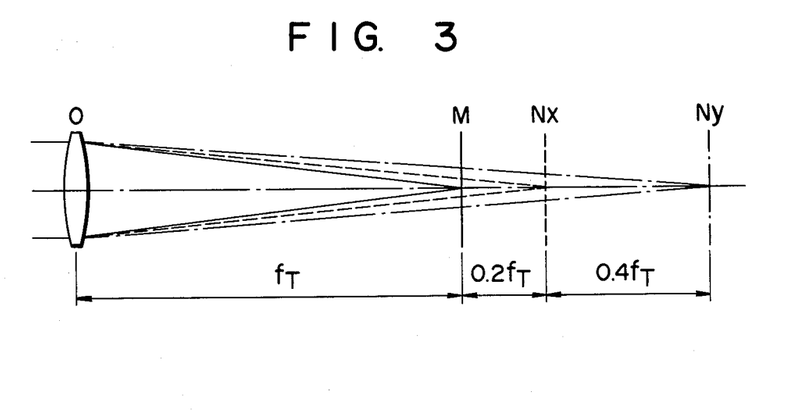
FIG. 3 shows the case using a tube lens with the focal distance $f_T$.

FIG. 3 depicts how an image is formed by a tube lens 0 which is a part of the objective with a focal distance $f_T$. In the figure, continuous lines indicate the light beams of visible rays. As shown, a visible ray image M is formed at the position distanced $f_T$ from tube lens 0. Broken lines indicate light beams of infrared rays by the objective X (not shown). An image Nx by infrared rays is formed at the position distanced 0.2 $f_T$ from the visible ray image M. One dot-chain lines indicate light beams of infrared rays by the objective Y (not shown). An image Ny by infrared rays is formed at the position distanced 0.4 $f_T$ from the infrared image Nx. In this case, assuming that the magnification of the visible rays image M is $\beta$, the magnification of infrared rays image Nx by objective X is 1.2 $\beta$, and the magnification by infrared rays image Ny is 1.6 $\beta$.

Figure 4:
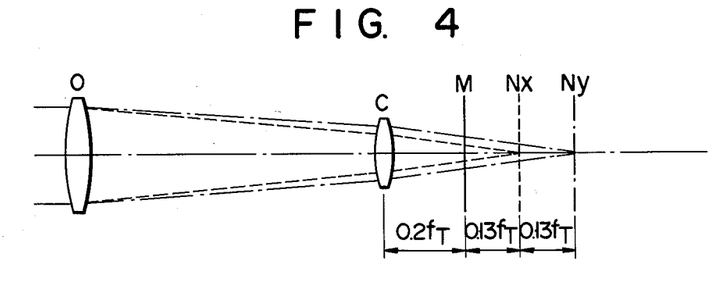
FIG. 4 shows the case using a reduction (convex) lens with the focal distance $2 f_T$ in addition to the tube lens of FIG. 3.

FIG. 4 shows an imaging state that exists when a convex lens C (converging lens with positive refractive index) with a focal distance of 2 $f_T$ is added to the configuration of FIG. 3 at a point 0.2 $f_T$ nearer than the image M by visible rays (between tube lens 0 and its image plane). When this is done, the infrared rays image Nx by objective X is formed 0.13 $f_T$ to the rear of visible rays image M, and the infrared rays image Ny by objective Y is formed at a point 0.13 $f_T$ farther to the infrared rays image Nx. The magnification of infrared rays image Nx is $\beta$, and the magnification of infrared rays image Ny is 1.22 $\beta$. When convex lens C is placed between tube lens 0 and visible rays image M (the image plane of tube lens 0), the displacement of the infrared rays images Nx and Ny by objectives X and Y can be reduced to 0.13 $f_T$ which is lower than the displacement (0.4 $f_T$) obtained when convex lens C is not used. The image magnification variation can also be reduced. Therefore, in this specification, the convex lens C is defined as the reduction lens which reduces the displacement and the magnification of the infrared rays image.

Figure 5:
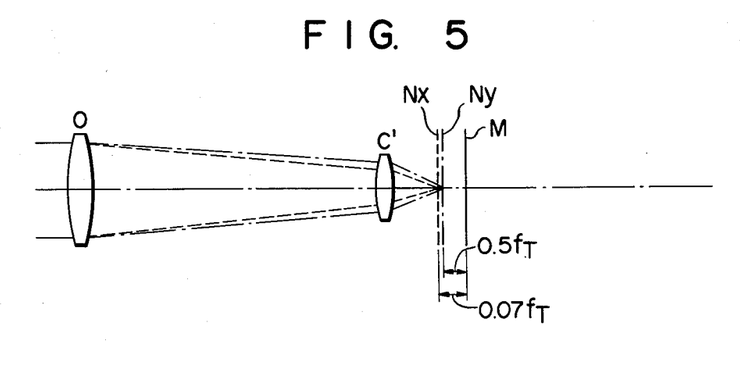
FIG. 5 shows the case using a reduction (convex) lens with the focal distance $0.2 f_T$ in addition to the tube lens of FIG. 3.

FIG. 5 shows an imaging condition existing when reduction lens C (with a focal distance of 2 $f_T$) in FIG. 4 is replaced by reduction lens C' with the focal distance 0.2 $f_T$ at the same position. In this case, the infrared rays image Nx by objective X is formed 0.07 $f_T$ in front of visible rays M, and the infrared rays image Ny by objective Y is formed 0.05 $f_T$ in front of visible rays image M. The magnification of infrared rays image Nx is now 0.33 $\beta$, and the magnification of infrared rays image Ny is 0.25 $\beta$. In this case also, when reduction lens C' is placed between tube lens 0 and visible rays image M, the displacement of the infrared rays images Nx and Ny by objectives X and Y can be reduced to 0.02 $f_T$. A variation of the magnification rate can also be reduced.

Figure 6:
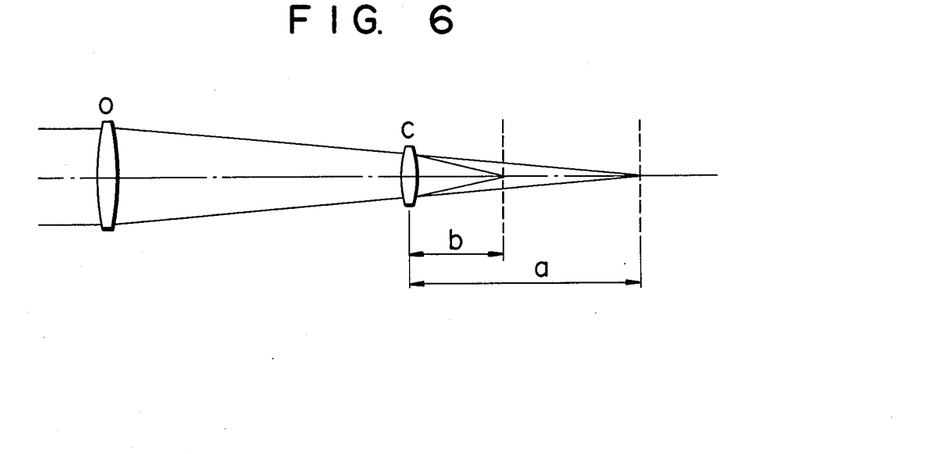
FIG. 6 shows a view illustrating an ordinary imaging state in the reduction optical system used in this invention.

As shown in FIG. 6, when a virtual image, which is located a distance "a" from the lens surface of a convex lens with a focal distance of "f", is projected to position "b", the following relationship holds $$1/a + 1/b = 1/f \quad (3)$$

Figure 7:
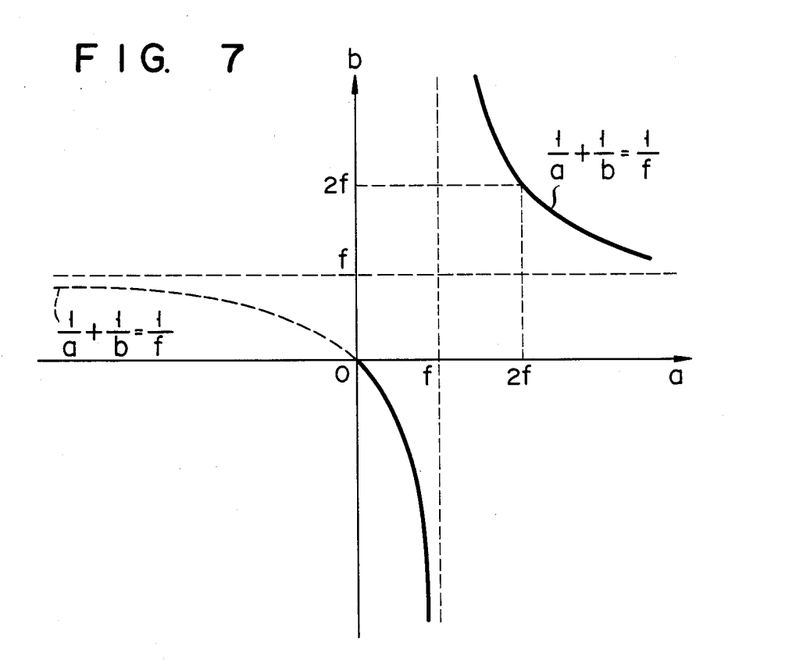
FIG. 7 shows a graph illustrating characteristics of the reduction optical system shown in FIG. 6.

The relationship of "a" and "b" are shown in FIG. 7. In FIG. 7, the range in which the relationship shown in FIG. 4 and FIG. 5 is satisfied is indicated by a broken line. At this time, even when the variation of "a" is large, the variation of "b" is small. Especially when "b" is positioned near the focal point of reduction lens C, this tendency is more conspicuous.

In actual practice, it is desirable for the post principal point of the reduction lens to be located between the objective and its image plane, and nearer to the image plane. In other words, a reduction lens system with focal distance less than ½ that of the objective should be placed in a position so that the post focal point will not be separated too far from the image plane of the objective.

When the reduction lens is provided between the objective and its image plane in this manner, the displacement of the image plane of the infrared rays, which is caused by variation of the focal distance of the objective, can be reduced.

Figure 8:
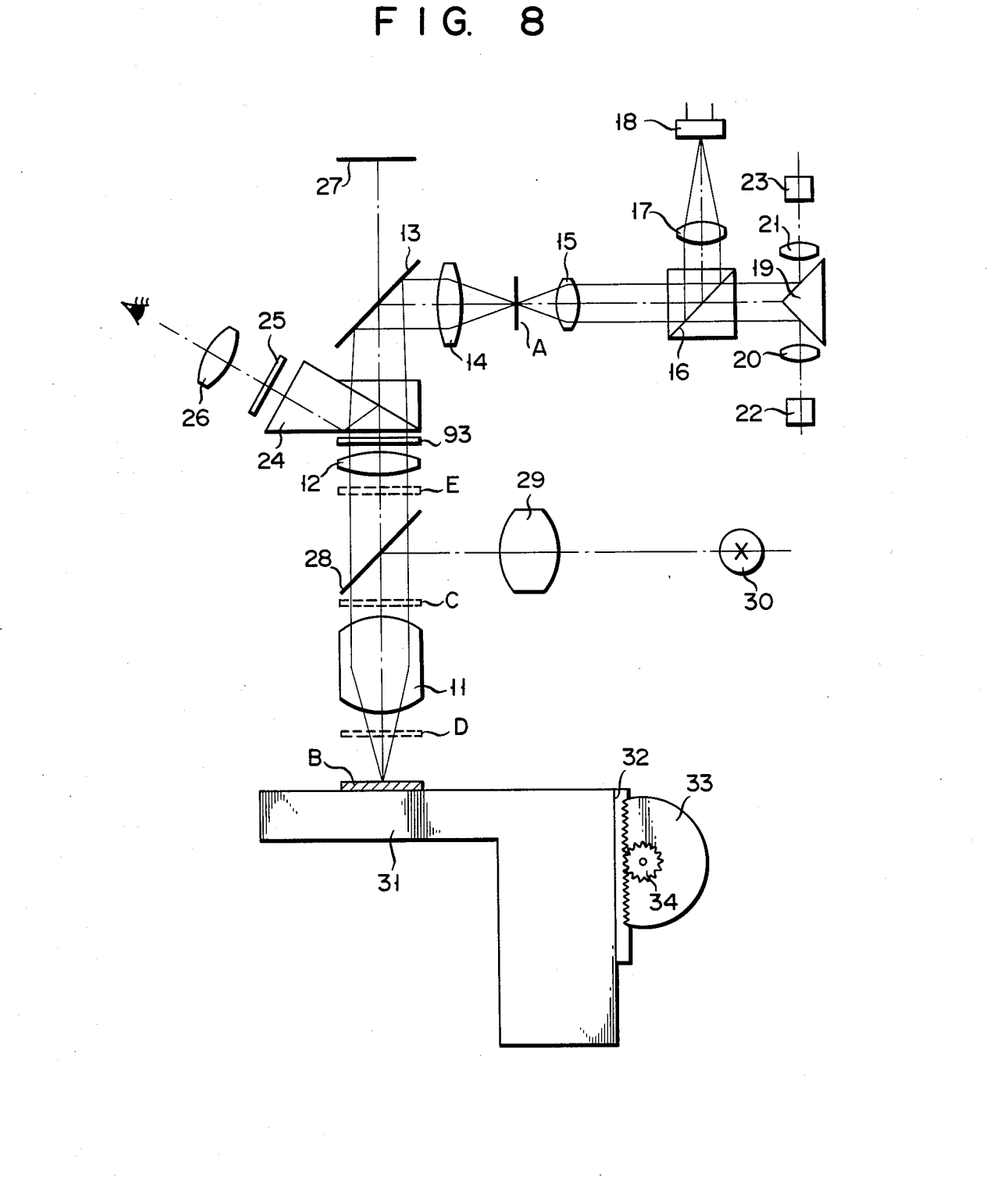
FIG. 8 shows a view illustrating an optical system of an automatic focusing microscope into which the first embodiment of a focusing degree-detecting device according to this invention is incorporated.

An automatic focusing microscope into which the first embodiment of the focusing degree-detecting device according to this invention is incorporated, is shown in FIG. 8. The focusing degree-detecting system is comprised of objective 11, tube lens 12, dichroic mirror 13, reduction lens 14 (convex lens) with positive refractive index, lens 15 for infrared rays spot projection, beam splitter 16, detecting lens 17, photo sensing element (position sensitive detector: PSD) 18, prism 19, small lenses 20 and 21, and infrared rays emitting elements (laser diodes) 22 and 23.

The infrared rays emitted alternately from laser diodes 22 and 23 are passed respectively, through small lens 20 and 21, are reflected by prism 19, pass through beam splitter 16, and are projected onto image plane A by projection lens 15. Then they are passed through reduction lens 14, dichroic mirror 13, tube lens 12, and objective 11, and projected onto specimen B. The infrared rays reflected by specimen B again pass through objective 11, tube lens 12, dichroic mirror 13, reduction lens 14 and projection lens 15, are reflected by beam splitter 16, and form a spot on PSD 18 through detecting lens 17. When an out-of-focus condition exists, the spot images of laser diodes 22 and 23 are formed at different positions on PSD 18. Therefore, the positions of the spot images alternately emitted by laser diodes 22 and 23 move alternately. In the in-focus state, the spot images by laser diodes 22 and 23 are formed at the same position on PSD 18, and even though the laser diodes 22 and 23 emit light alternately, their position does not change. For this reason, the focusing operation is performed by moving specimen B in order to form the spot image at the fixed position. From the direction and distance of movement of the spot image during the focusing operation, a prefocal or post focal point, and amount of the defocus can be detected.

Prism 24 with half mirror surfaces, infrared ray cut filter 25, eyepiece 26, and film surface 27, together with objective 11 and tube lens 12 make up a viewing/photographic optical system.

The illuminating optical system is made up of halfmirror 28, condenser lens 29, and light source for illumination 30, together with objective lens 11 and tube lens 12.

Stage 31, provided with rack 32, can be moved in the direction of the optical axis (up and down). Motor 33 has pinion 34, which meshes with rack 32 affixed to its revolving axis. The rack and pinion combination drives stage 31.

In the focus detecting optical system, reduction lens 14 is provided between image plane A, which is formed by objective lens 11. Therefore, as explained in FIGS. 3 to 6, when objective lens 11 is replaced with a lens with a different amount of chromatic aberration and a different focal distance, in order to change the magnification, the displacement of the image by infrared rays from image plane A can be minimized.

In this embodiment, a circuit for substantially moving objective lens 11 within the range corresponding to the displacement is provided and, the remaining displacement of the infrared rays image can be compensated for electrically by the correction circuit described below. The amount of displacement of the infrared rays image that can be electrically corrected is not very large, but since the displacement has already been corrected by reduction lens 14 in this embodiment, the displacement can be completely corrected by the correction circuit. For this reason, even when the objective lens 11 is replaced, perfect focus can be maintained.

Figure 9:
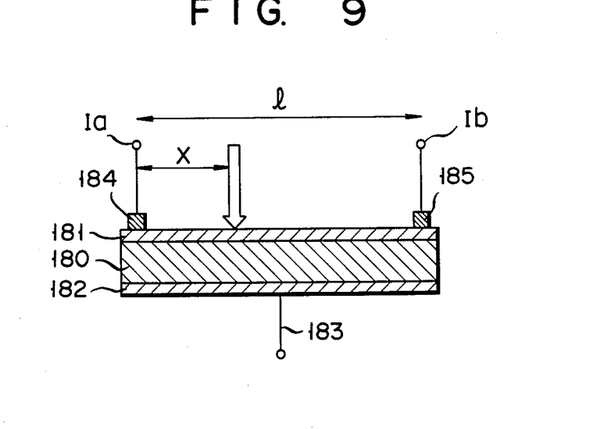
FIG. 9 shows a cross section of a photo sensing element used in the first embodiment.

FIG. 9 is a cross-sectional view showing the structure of PSD 18. A p-type resistor layer 181 and an n+-type layer are applied to opposite sides of high resistance silicon substrate 180. Common electrode 183 is connected to n+-type layer 182. Electrodes 184 and 185 are connected to the opposing edges of p-type resistor layer 181. When a light beam strikes p-type resistor layer 181, the photoelectric effect occurs at the p-n junction. Output currents Ia and Ib are generated from electrodes 184 and 185 respectively, based on the incident position of the light. If the distance between electrodes 184 and 185 is "l", the resistance of the entire p-type resistor layer 181 is "Rl", the distance between electrode 184 and the incident position of the light is "x", the resistance of the portion of p-type resistor layer 181 between electrode 184 and the incident position of the light is "Rx", and the photocurrent generated by the incident light is "Io", Ia and Ib can be expressed by $$Ia = (Rl - Rx)Io/Rl \quad (4)$$

$$Ib = Rx Io/Rl \quad (5)$$

If the resistance of p-type resistor layer 181 is uniform throughout its area, the following relationships can be obtained.

$$Ia = (l - x)Io/l \quad (6)$$
$$Ib = x Io/l \quad (7)$$

Therefore, output currents Ia and Ib from electrodes 184 and 185 can be written $$(Ia - Ib)/(Ia + Ib) = (l - 2x)/l \quad (8)$$

By this calculation, the incident position of the light (i.e., distance x) can be obtained regardless of the amount of the incident energy, i.e., the incident light. The amount of incident light is $$Io = Ia + Ib \quad (9)$$

Figure 10:
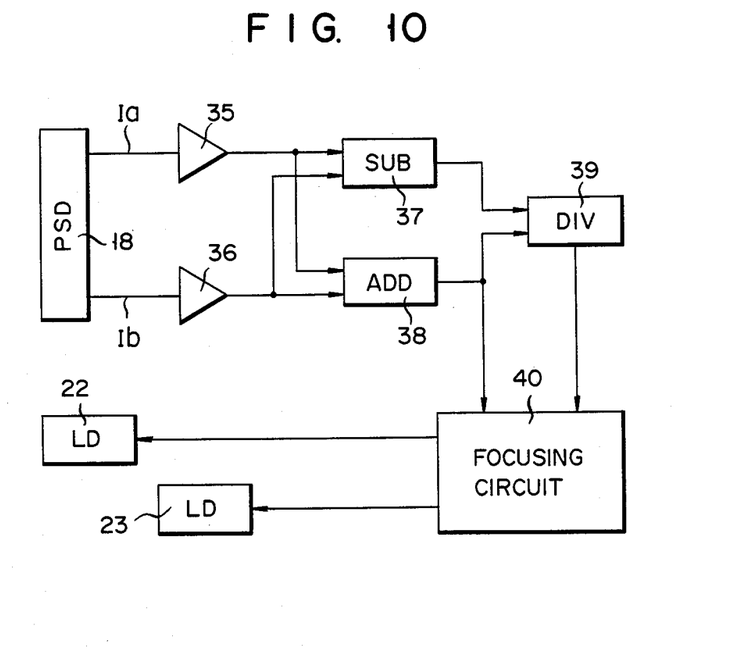
FIG. 10 shows a block diagram illustrating an electric circuit succeeding to the photo sensing element of the first embodiment.

FIG. 10 is a block diagram of focal point detecting circuit connected to PSD 18. Output signal Ia from PSD 18 is supplied to subtractor 37 via current/voltage converter 35. Similarly, another output signal Ib from PSD 18 is supplied to adder 38 via another current/voltage converter 36. Subtractor 37 performs the operation of the numerator of the formula (8), and adder 38, the operation of the denominator of the formula (8). The outputs of both subtractor 37 and adder 38 are supplied to divider 39. Divider 39 performs the operation of the formula (8), to find out the position x of a point image formed by light emitting diodes 22, 23. The output of divider 39 is supplied to focusing circuit 40. Focusing circuit 40 also controls the alternate light emission of laser diodes 22 and 23.

Figure 11:
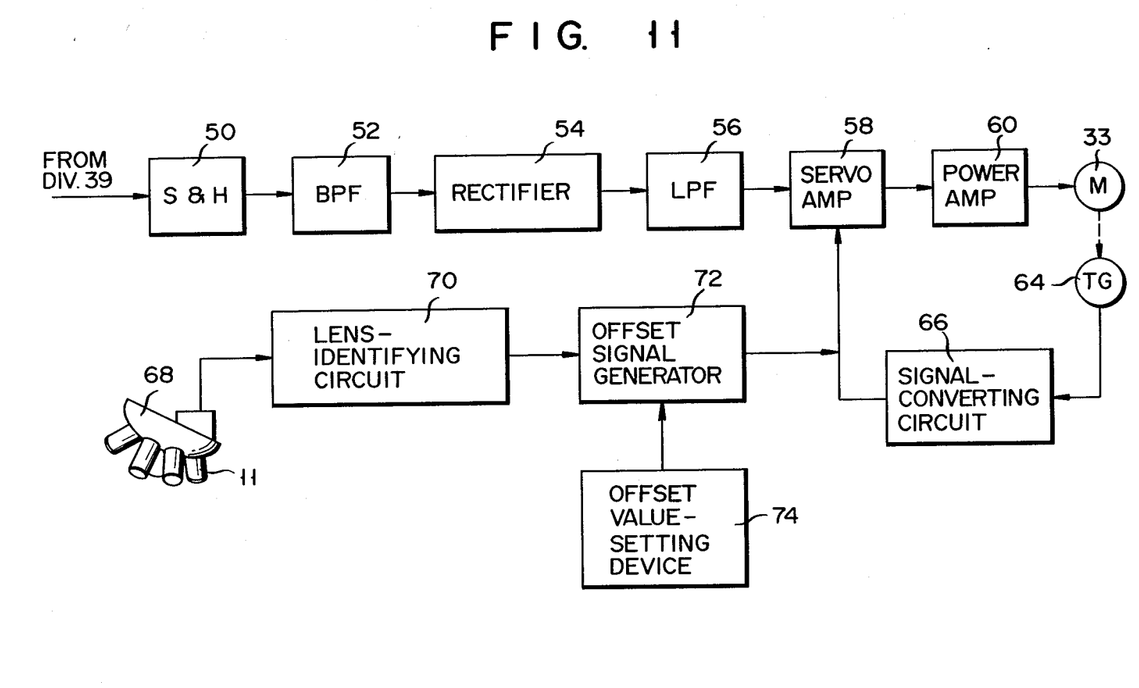
FIG. 11 shows a block diagram showing the focusing circuit of FIG. 10.

FIG. 11 shows the details of focusing circuit 40. The output of divider 39 is supplied to servo amplifier 58, via sample/hold circuit 50, band-pass filter 52, rectifier 54 and low-pass filter 56. The output of servo amplifier 58 is used to drive motor 33, via power amplifier 60. The speed of rotation of motor 33 is detected by tachometer 64, and then fed back to servo amplifier 58 via signal-converting circuit 66.

The output of lens-identifying circuit 70, which is connected to objective 11, is input to offset signal generator 72. Offset signal generator 72 is connected to offset value-setting device 74. The output of offset signal generator 72 is also fed back to servo amplifier 58.

Figure 12:
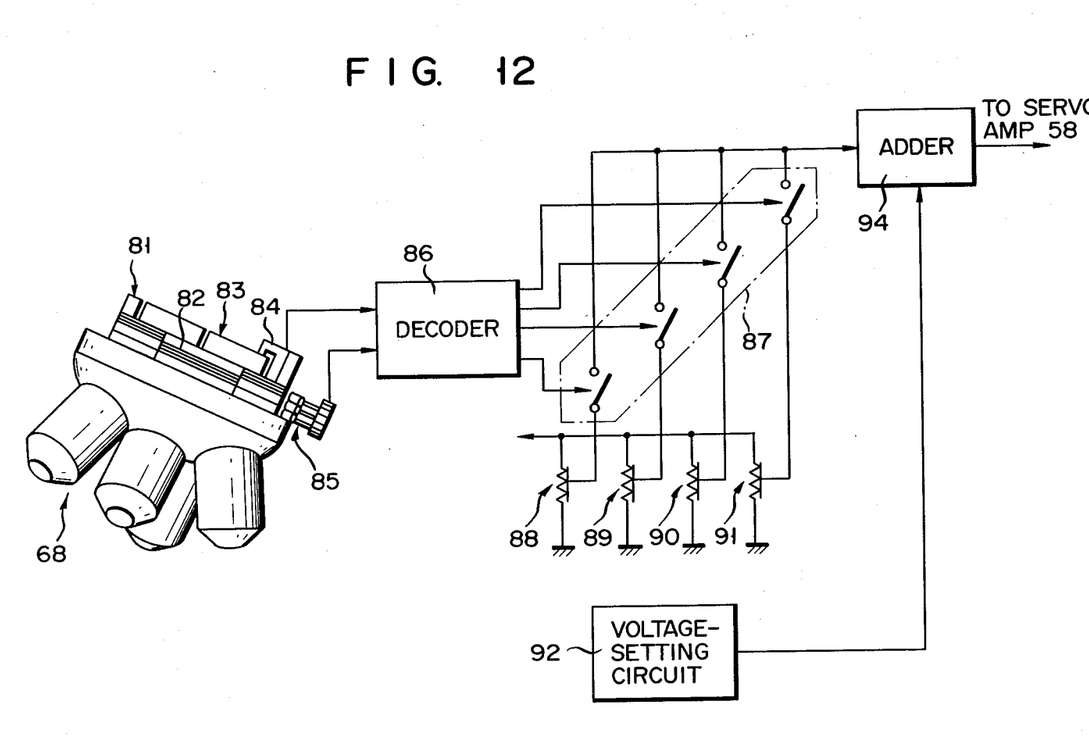
FIG. 12 shows a block diagram of the offset signal generator of FIG. 11.

FIG. 12 shows in block form the details of lens identifying circuit 70, offset signal generator 72 and offset value setting circuit 74. Revolver 68 is provided with a plurality of objectives 11, and by rotating revolver 68, a desired objective 11 is selected from those objectives 11. The microscope is provided with code plate 81 which rotates in synchronism with the rotation of revolver 68. The peripheral surface of code plate 81 is marked with reflecting codes 82, each of which corresponds to each screw hole of revolver 68 for mounting objectives, respectively. Slits 83 are provided at one edge of code plate 81, each of which corresponds to the screw hole for mounting objectives. The signals of photo interruptor 84 for detecting slit 83 and photo reflector 85 for reading reflecting code 82 are both input to decoder 86, which functions as a lens discriminating circuit.

Decoder 86 outputs a signal which is dependent on the focal distance of each objective. The output of decoder 86 turns on one of switches of switch circuit 87. By turning on the switch, one of the outputs of voltage dividers 88, 89, 90 and 91, which divide DC voltage Vref, is applied to servo amplifier 58 through adder 94 as an offset signal. The output voltages of these voltage dividers 88 to 91 are determined in accordance with the chromatic aberrations of the corresponding objectives, respectively. Voltage-setting circuit 92 is a circuit which can generate desired DC voltage by external control. The output of circuit 92 is supplied to adder 94.

Figure 13A:
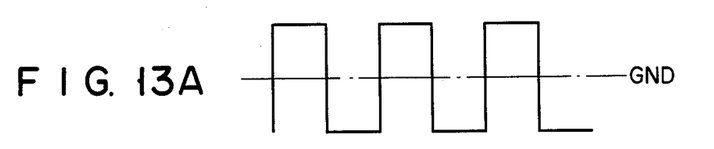
FIGS. 13A to 13E show a set of waveforms useful in explaining the operation of the first embodiment.

Next, the operation of this embodiment will be described, with reference to FIGS. 13A through 13E. Sample/hold circuit 50 samples and holds the output of divider 39, at the timing of the light emitting by light emitting elements 22 and 23. Since light emitting elements 22 and 23 project light beams at angles symmetrically with respect to the optical axis and in different direction, sample/hold circuit 50, in the out-of-focus state, produces a signal with rectangular wave whose amplitude swings between positive and negative sides with respect to ground level (GND), as shown in FIG. 13A. The amplitude of this output signal indicates the amount of the defocus.

Figure 13B:
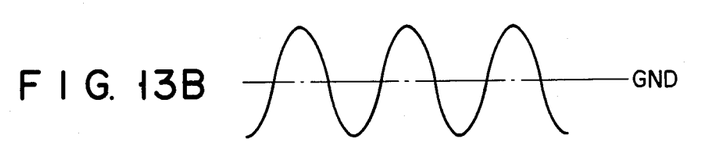
Figure 13C:
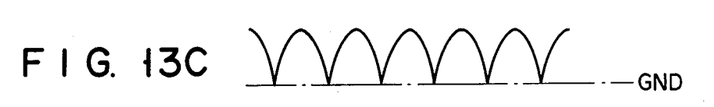
Figure 13D:
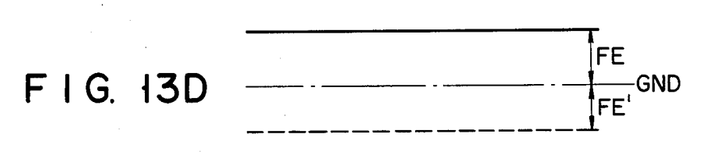

The output of band-pass filter is as shown in FIG. 13B. The output of rectifier 54 is as shown in FIG. 13C. If this output is passed through low-pass filter 56, a DC signal as shown in FIG. 13D is obtained. DC component FE shown in FIG. 13D corresponds to the amount of defocus (degree of defocusing). The amount of defocus is expressed by formula (1). Accordingly, at the focused state, FE=0, which is equal to GND level. When the focal point is shifted in the direction opposite to the above direction, negative DC voltage is generated, as shown by FE' shown in FIG. 13D.

Using the DC voltage, motor 33 is driven to drive stage 31 by servo amplifier 58 and power amplifier 60, so that a focusing operation is performed so as to set the amount of defocus FE to zero. The distance of movement of stage 31 is expressed by formula (2). The speed of rotation of motor 33 is detected by tachometer 64, and is then signal-converted by signal converting circuit 66. The signal is fed back to servo amplifier 58, thereby providing the servo system with a damping characteristic, and improving stability and the accuracy of focusing operation.

Figure 13E:
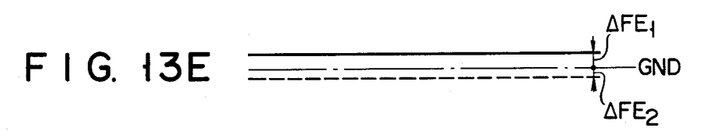

As described above, since the imaging positions by the visible rays and infrared rays are not coincident, and the distance between the positions depends on the objectives, it can sometimes happen that for some objective, a wrong amount of defocus FE is detected. In this embodiment, however, offset signal generator 72 generates, for every objective, an offset signal to compensate this wrong amount of defocus, and it is fed back to servo amplifier 58. In this way, that defocus amount FE of each objective can be corrected completely. Output offset signals $\Delta FE_1$ and $\Delta FE_2$ of offset signal generator 72 are shown in FIG. 13E.

As shown in FIG. 12, since the offset signal is added with the output of voltage setting circuit 92, any offset voltage can be set. Therefore, it is possible to intentionally set up an out-of-focus state, if necessary. Since this focal point detecting method employs the reflected light, only the surface of an object (with a thickness) that faces the objective can be subjected to the focusing. Therefore, the intentional set-up of such an out-of-focus state is useful when observing desired portions of the object other than this surface. For example, such needs arise when inspecting the photo mask pattern of an IC. Needless to say, it is also possible to realize the out-of-focus state by changing the voltage ratio of the voltage divider.

As described above, in the first embodiment, by installing a convex lens (reduction lens) between the objective and the imaging plane, the displacement of the imaging position of the infrared ray, with respect to the imaging position of visible ray, which is caused by the chromatic aberration and which varies due to the focal distance difference of objectives can be reduced. The reduced displacement is further corrected to zero by electrically correcting the value of the focusing degree-detecting signal. Therefore, a high accuracy focusing degree-detecting device of projection type for detecting the focusing degree by using infrared rays, can be realized.

When the objective is replaced, it is possible to automatically set the offset voltage back to original value corresponding to the each objective, by using decoder 86. The sample/hold function by sample/hold circuit 50 is unnecessary, if light emitting elements 22 and 23 emit light alternately at duty ratio of 50%.

Also, if $\lambda/4$ plate 62 is inserted between tube lens 12 and prism 24, and beam splitter 16 is replaced by polarizing beam splitter, flair light is removed from the surface of the lens between the $\lambda/4$ plate 62 and polarizing beam splitter 16 and the reflected beam to PSD 18 is increased, thereby improving S/N ratio. Inserting location of $\lambda/4$ plate 62 may be either C, D, or E in FIG. 8.

The wavelength of the light emitted by light emitting elements 22 and 23 are not necessarily the same wavelength, but may be different. In such a case, the refraction index of the objective varies in accordance with the wavelength, so that it is necessary to change the signal for every wavelength.

Furthermore, there is no need to install two light emitting diodes, it may be only one. In this case, if the light emitting element emits light continuously, sample/hold circuit 50, BPF 52, rectifier 54 and LPF 56 need not be installed. Then, divider 39 directly outputs a DC signal of a level dependent on the amount of defocus. An ordinary lamp, a LED or laser can be used for the light emitting element. The photo sensing element can be an ordinary image sensor, of CCD or MOS type, for example, instead of PSD.

Figure 14:
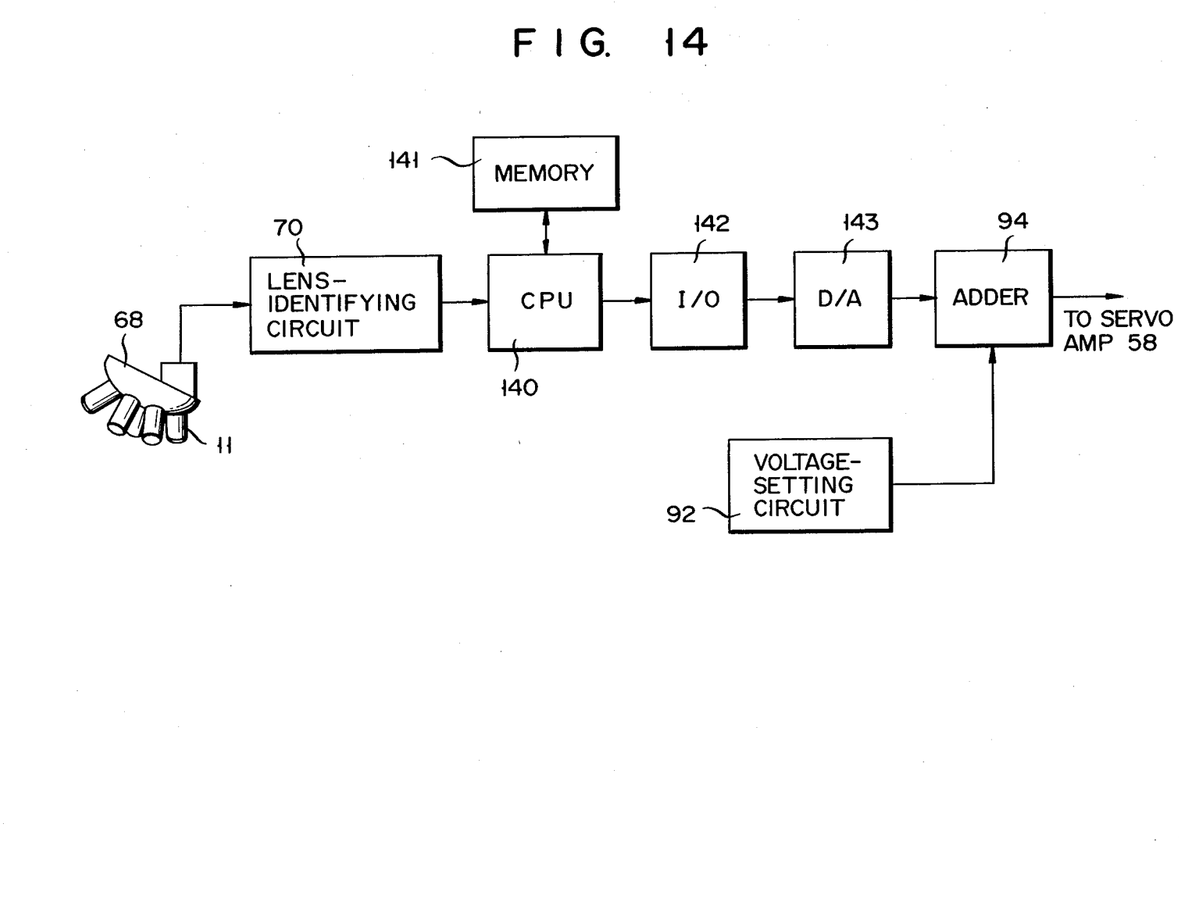
FIG. 14 shows a block diagram showing the modification of the focusing circuit of FIG. 10.

FIG. 14 shows a modification of the offset signal generator 72 of the first embodiment. The output from lens identifying circuit 70 is supplied to CPU 140. CPU reads out the offset data in accordance with the identified objective from memory 141. This read out data is supplied to adder 94 through I/0 142 and D/A converter 143.

Figure 15:
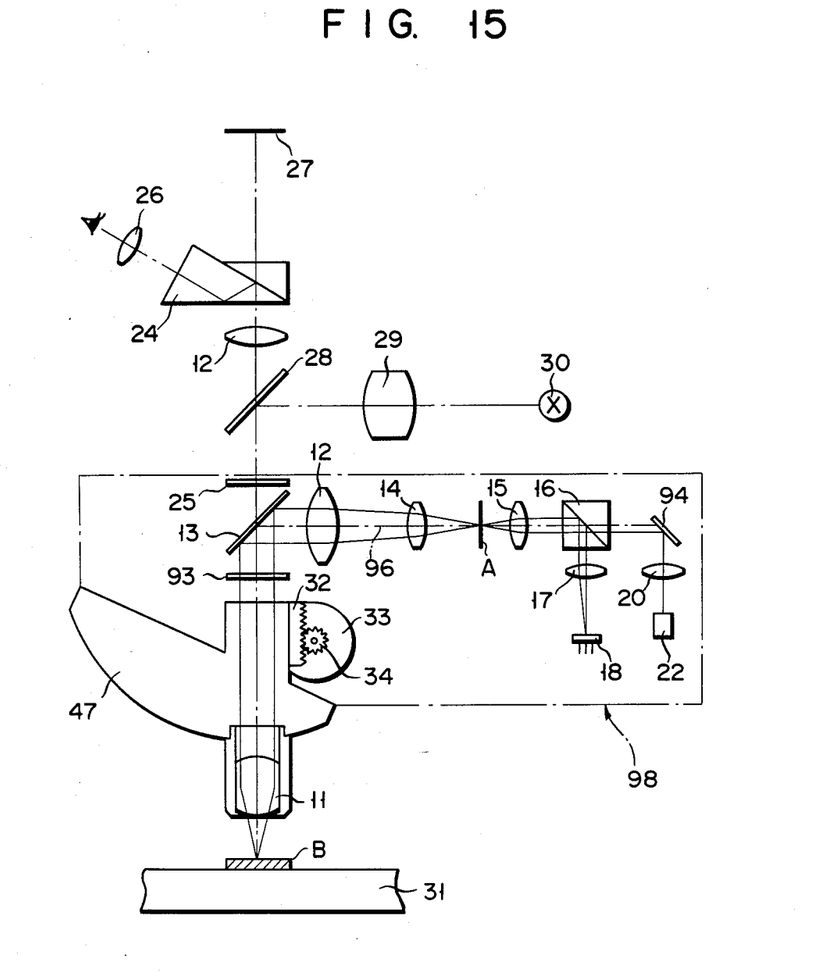
FIG. 15 shows a view illustrating an optical system into which the second embodiment of a focusing degree-detecting device according to this invention is incorporated.

FIG. 15 shows an optical system of a second embodiment of an automatic focusing microscope according to this invention. The portions identical to those of the first embodiment (FIG. 8) are designated by the same reference numerals. In the second embodiment, only one light emitting diode (light emitting diode 22) is installed. The light beam from light emitting element 22 is passed through small lens 20, reflected by mirror 94, and travels through an optical path deviated from the optical axis. After being passed through beam splitter 16, infrared spot projection lens 15, reduction (convex) lens 14, tube lens 12 and dichroic mirror 13, the light beam is projected on specimen B through objective 11. The light beam as reflected by specimen B travels along an optical path which is contained in the part of the cross section of the luminous flux, which is opposite to part of the cross section containing the incident path, with respect to the optical axis. Then, it reaches beam splitter 16, then reflected thereat and is imaged on PSD 18 by detecting lens 17. The principle of focal point detecting is the same as for the first embodiment.

The second embodiment differs from the first embodiment in the following points. Dichroic mirror 13 for guiding the beam to the focal point detecting system is installed below (near objective 11) half mirror 28 for guiding the beam to the illuminating optical system. The focal point-detecting system (shown enclosed by one-dot-chain line) is installed in one unit 98 together with revolver 47, and the focusing operation is made by moving revolver 47 instead of specimen B. Accordingly, in the microscope of the type in which revolver 47 is moved to focusing, just by replacing revolver 47 by unit 98, the manual focusing device can be easily altered to the automatic focusing device.

As seen from the foregoing, when the objective is replaced, the displacement of the image plane by infrared rays for detecting the focusing degree, which is due to the chromatic aberration, can be minimized by the reduction optical system, without moving the aberration correction lens by infrared rays in the manual or electrical manner. The reduced displacement is further reduced using the focusing degree-detecting signal. Therefore, the focusing degree-detecting device of the light mark projection-type in which a degree of focusing in the optical system is detected using infrared rays, is good in operability and low in cost.

This invention is not limited to a microscope alone, but is applicable to other optical instruments and medical devices as well, such as cameras, rigid-endoscopes and fundus cameras. This invention is not limited to the above-mentioned embodiments, but may be applied for other focusing degree-detecting devices of the light mark projection-type.

What is claimed is:

1. A focusing degree-detecting device comprising:

a view optical system having an optical axis, and including an objective;

focusing degree-detecting means for projecting infrared rays to an object through a light path deviated from the optical axis and for obtaining information of the focusing degree of the optical system for said object, based on a deviation of reflected light by the object from the optical axis;

a reduction optical system having a positive refractive power and provided between said objective and an image plane of said objective;

compensating circuit means coupled to said focusing degree-detecting means for correcting the focusing degree information obtained by said focusing degree-detecting means according to the magnification of said objective; and focus adjusting means for adjusting a distance between an element, which is integrally formed with both said viewing optical system and said reduction optical system, and a specimen in accordance with the compensated focusing degree information.

2. A focusing degree-detecting device according to claim 1, further comprising identifying means for identifying the type of the objective and for supplying an output signal corresponding to the type of the objective to said compensating circuit means.

3. A focusing degree-detecting device according to claim 2, in which said identifying means includes means for outputting a signal representing the magnification and an achromatic type of the objective.

4. A focusing degree-detecting device, according to claim 1, in which:

said focusing degree-detecting means includes light emitting means for projecting infrared rays along the light path deviated from the optical axis of said optical system, and position sensing means for detecting the displacement of the image obtained by the infrared rays reflected at said object and producing the focusing degree information according to the detected displacement; and said compensating circuit means includes means for generating an offset signal in accordance with the magnification of said objective, and means for adding said offset signal to the focusing degree information output by said position sensing means.

5. A focusing degree-detecting device according to claim 4, in which said position sensing means includes a p-n junction having photoelectric effect, and two terminals which are mounted on two different edges of said p-n junction, and output currents being generated between said terminals in accordance with the distances between the light incident position on said position sensing means and said edges.

6. A focusing degree-detecting device according to claim 4, in which said light emitting means includes plural light emitting elements which emit infrared rays alternately at angles symmetrical with respect to the optical axis.

7. A focusing degree-detecting device according to claim 6, in which said plural light emitting elements emit light of the same wavelength.

8. A focusing degree-detecting device according to claim 6, in which said plural light emitting elements emit lights of different wavelengths, and said offset signal generating means includes means for generating respective offset signals during the emitting periods of said plural light emitting elements, the offset signals corresponding, respectively, to the different wavelengths.

9. A focusing degree-detecting device according to claim 4, in which said offset signal generating means comprises a voltage dividing circuit.

10. A focusing degree-detecting device according to claim 4, in which said offset signal generating means comprises a memory for storing the offset data.

11. A focusing degree-detecting device according to claim 4, in which said offset signal generating means comprises means for manually correcting the offset signal.

12. A focusing degree-detecting device according to claim 1, in which said focus adjusting means comprises means for moving the specimen with respect to the element in accordance with the focusing degree information.

* * * * *